(12) United States Patent
Chang et al.

(10) Patent No.: US 9,560,583 B2
(45) Date of Patent: Jan. 31, 2017

(54) GATEWAY SELECTION BASED ON GEOGRAPHICAL LOCATION

(71) Applicants: Verizon Patent and Licensing Inc., Arlington, VA (US); Cellco Partnership, Arlington, VA (US)

(72) Inventors: Patricia R. Chang, San Ramon, CA (US); Lalit R. Kotecha, San Ramon, CA (US); Sagiv Draznin, Walnut Creek, CA (US); Deepak Kakadia, Union City, CA (US); Jay J. Lee, San Ramon, CA (US); Thomas H. Tan, San Jose, CA (US); Donna L. Polehn, Kirkland, WA (US); David Chiang, Fremont, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 334 days.

(21) Appl. No.: 13/724,645

(22) Filed: Dec. 21, 2012

(65) Prior Publication Data

US 2014/0177523 A1    Jun. 26, 2014

(51) Int. Cl.
*H04W 36/08* (2009.01)
*H04W 48/00* (2009.01)
*H04W 8/06* (2009.01)

(52) U.S. Cl.
CPC .............. *H04W 48/17* (2013.01); *H04W 8/06* (2013.01)

(58) Field of Classification Search
CPC ...... H04W 60/00; H04W 4/023; H04W 36/12; H04W 36/32; H04W 88/16; H04W 8/06; H04W 8/26; H04W 8/082; H04W 48/18; H04W 76/041; H04L 29/08; H04L 29/12; H04L 29/12113; H04L 29/12594; H04L 29/12066; H04L 29/12132; H04L 67/2842; H04L 67/18; H04L 67/2814; H04L 67/1021; H04L 67/04; H04L 67/1002; H04L 67/327; H04L 61/303; H04L 61/304; H04L 61/305; H04L 61/3075; H04L 61/1511; H04L 61/1541; H04L 61/1552; H04L 63/162
USPC ................... 370/328–338; 709/219; 455/432
See application file for complete search history.

(56) References Cited

U.S. PATENT DOCUMENTS

| 2006/0206586 A1* | 9/2006 | Ling ................. H04L 29/12113 709/219 |
| 2010/0034180 A1* | 2/2010 | Zhu ......................... H04W 4/02 370/338 |
| 2010/0054222 A1* | 3/2010 | Rune ................. H04L 29/12066 370/338 |

(Continued)

*Primary Examiner* — Andrew Chriss
*Assistant Examiner* — Rasha Fayed

(57) ABSTRACT

A system may be configured to receive information regarding a geographical location of a user device; and compare the geographical location of the user device to geographical locations of a set of gateway devices. The gateway devices may be associated with a cellular network, and the gateway devices may communicatively couple one or more network devices associated with the cellular network to an access point that is not associated with the cellular network. The system may further select a particular gateway device based on the geographical location of the user device and the geographical locations of the particular gateway device; and store or output information regarding the selected particular gateway device.

20 Claims, 13 Drawing Sheets

(56) References Cited

U.S. PATENT DOCUMENTS

| | | | | |
|---|---|---|---|---|
| 2010/0214982 A1* | 8/2010 | Hirano | H04L 29/12216 | 370/328 |
| 2010/0272013 A1* | 10/2010 | Horn | H04W 76/022 | 370/328 |
| 2011/0292912 A1* | 12/2011 | Zembutsu | H04W 36/00 | 370/331 |
| 2012/0136798 A1* | 5/2012 | Navar | G06Q 20/3829 | 705/71 |
| 2012/0204253 A1* | 8/2012 | Sugimoto | H04L 12/4633 | 726/12 |
| 2012/0276867 A1* | 11/2012 | McNamee | H04L 12/1407 | 455/406 |
| 2012/0322412 A1* | 12/2012 | Qiang | H04W 48/16 | 455/411 |
| 2014/0153559 A1* | 6/2014 | Roeland | H04L 61/304 | 370/338 |

* cited by examiner

GATEWAY SELECTION BASED ON GEOGRAPHICAL LOCATION

BACKGROUND

Wireless networks, such as cellular networks, may provide network connectivity to user devices, such as cellular telephones. Cellular telephones may access cellular networks using cellular radio access technologies ("RATs"), such as a third generation ("3G") RAT, a fourth generation ("4G") RAT, and/or another cellular RAT. Cellular telephones may also access cellular networks via one or more other networks, such as a wireless local area network ("WLAN"), also sometimes referred to as a "WiFi network."

Some cellular network providers may support services, such as video conferencing, voice calls, or the like. When connected to a WiFi network, a cellular telephone may use such services. For example, when connected to a particular WiFi network, a cellular telephone may use a video conferencing service associated with a particular cellular network provider. The cellular network provider may deploy several gateway devices, such as Evolved Packet Data Gateways ("ePDGs"), which may allow the cellular network provider to provide the video conferencing service to the cellular telephone via the WiFi network. These ePDGs may be located in geographically distinct locations (e.g., in different cities or states within a particular country).

DETAILED DESCRIPTION OF PREFERRED EMBODIMENTS

The following detailed description refers to the accompanying drawings. The same reference numbers in different drawings may identify the same or similar elements.

Some cellular network providers allow user devices (such as cellular telephones) to access network services via radio access networks ("RANs"), which may be provided by the cellular network providers. Some cellular network providers may allow user devices to access the network services of the cellular provider, even when the user devices obtain network connectivity through an access network other than the RAN of the cellular provider. For example, a user device may access network services, of the cellular network provider, through an Internet connection accessed via a local area network ("LAN"), such as a wireless LAN ("WLAN") e.g., a "WiFi network".

In order to provide network services to user devices that access a cellular network through an external network (e.g., a network that is not provided by a cellular network provider associated with the cellular network), the cellular network provider may provide a gateway device that connects the user device, via the external network, to the cellular network. For instance, some cellular networks may include a set of evolved Packet Data Gateways ("ePDGs"), which may connect to the cellular network, via, for example, the Internet. Some networks may include ePDGs that are located in various geographic locations.

Figure 1:
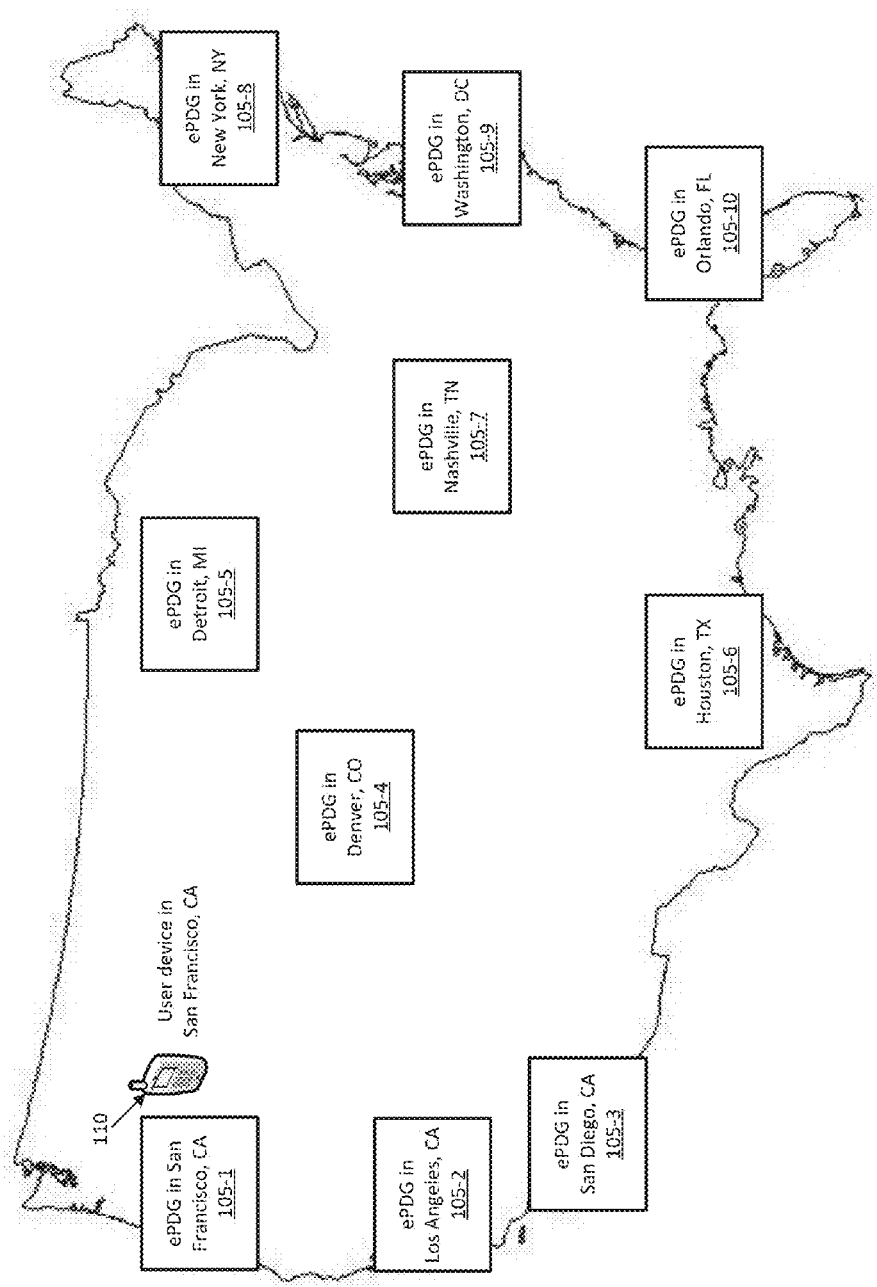
FIGS. 1-3 illustrate an overview of one or more example implementations described herein.

For example, as shown in FIG. 1, a cellular network may be associated with a set of ePDGs 105-1 through 105-10 (herein referred to collectively as "ePDGs 105," or individually as "ePDG 105"). As shown in this example, these ePDGs 105 may be located throughout the United States of America. For instance, ePDG 105-1 may be located in San Francisco, Calif.; ePDG 105-2 may be located in Los Angeles, Calif.; ePDG 105-3 may be located in San Diego, Calif.; ePDG 105-4 may be located in Denver, Colo.; etc. As further shown in FIG. 1, user device 110, which may be associated with the cellular network, may be located in San Francisco, Calif.

When user device 110 attempts to connect to the cellular network via, for example, the Internet (which may occur when user device 110 connects to a WiFi network), the cellular network may assign a particular ePDG 105, via which user device 110 should connect to access the cellular network. In some implementations, when attempting to connect to the cellular network, user device 110 may send information to the cellular network regarding a geographical location of user device 110. As will be described further below, an ePDG selector associated with the cellular network may receive the information regarding the geographical location of user device 110, and may select a particular ePDG 105 based on the geographical location of user device 110. For example, the ePDG selector may select the nearest ePDG 105 to user device 110.

Figure 2:
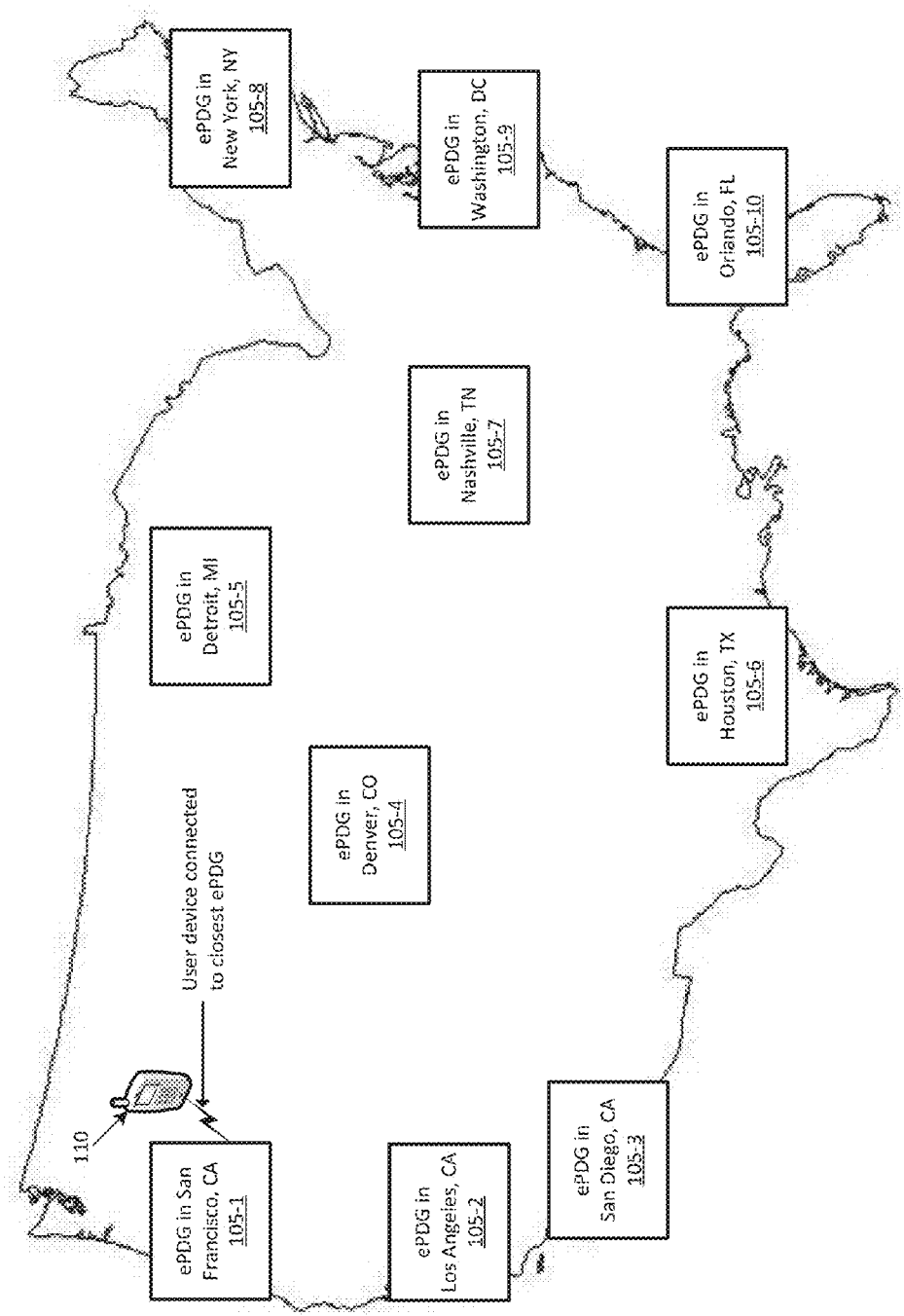

As shown in FIG. 2, and continuing with the example shown in FIG. 1, user device 110 may receive information identifying ePDG 105-1 (e.g., a uniform resource locator ("URL")), which is nearest to user device 110. Based on this information, user device 110 may establish a connection (e.g., a Transmission Control Protocol ("TCP") connection) with ePDG 105-1 to connect with the cellular network. Via this connection with ePDG 105-1, user device 110 may send and/or receive data to and/or from the cellular network.

Figure 3:
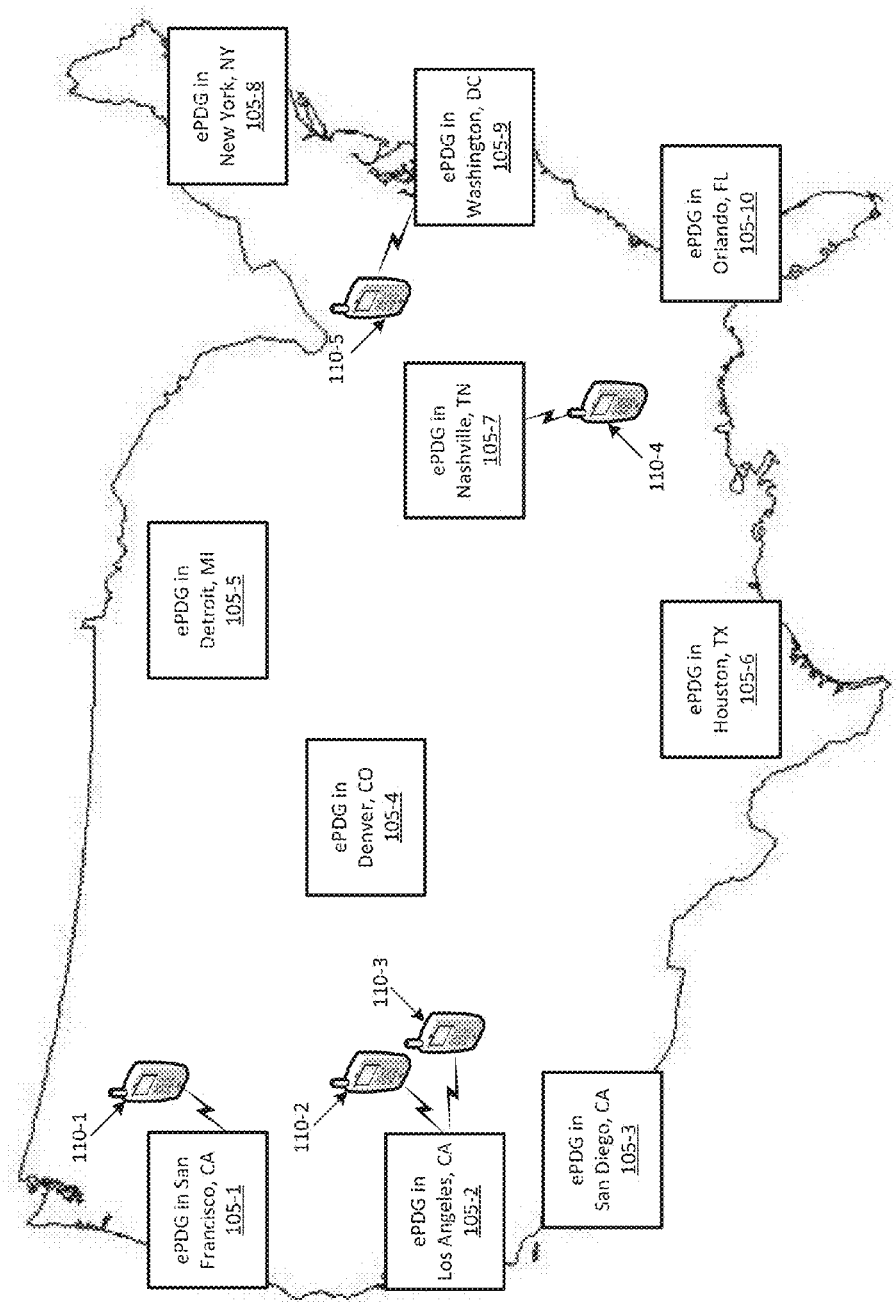

FIG. 3 further illustrates that user devices 110-1 through 110-5 may connect to ePDGs 105 based on the geographical location of user devices 110 and ePDGs 105 (e.g., to ePDGs 105 that are closest, respectively, to user devices 110). For instance, as shown in this example, user device 110-1 may connect to ePDG 105-1, user devices 110-2 and 110-3 may connect to ePDG 105-2, user device 110-4 may connect to ePDG 105-7, and user device 110-5 may connect to ePDG 105-9.

By selecting a particular ePDG 105 for a particular user device 110 to connect to, based on geographical locations of the particular ePDG 105 and the particular user device 110, some implementations may improve performance when user devices 110 connect to cellular networks via an ePDG 105. For instance, referring to the example shown in FIG. 3, network latency between user device 110-1 and ePDG 105-1, in San Francisco, may be lower than network latency between user device 110-1 and ePDG 105-9, in Washington, D.C. Implementations that select an ePDG 105 based on locations may provide better performance than methodologies that do not select an ePDG 105 based on location, such as "round-robin" selection, random selection, or other methodologies.

Figure 4:
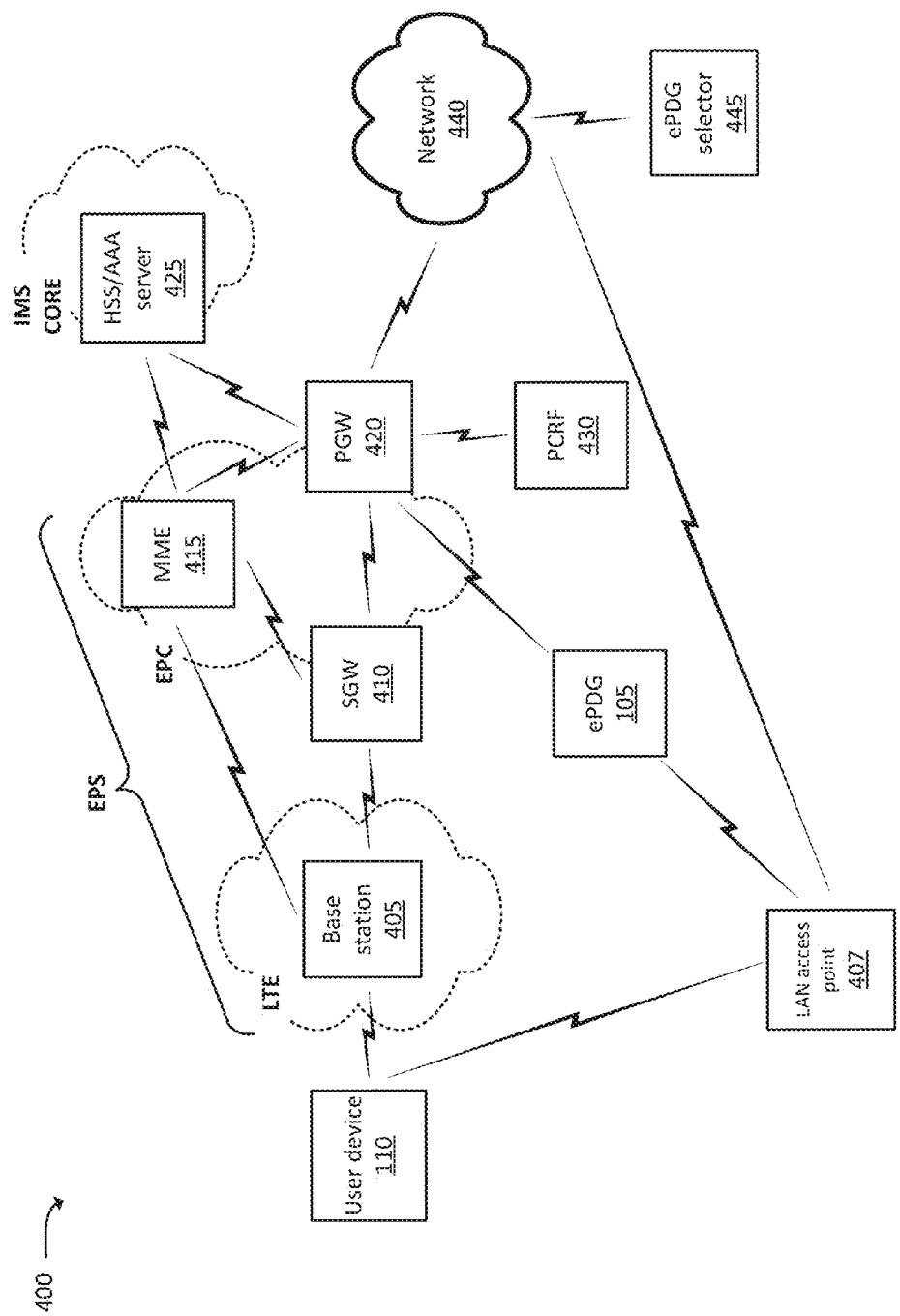
FIG. 4 illustrates an example environment in which systems and/or methods, described herein, may be implemented.

FIG. 4 illustrates an example environment 400, in which systems and/or methods described herein may be implemented. As shown in FIG. 4, environment 400 may include ePDG 105, user device 110, base station 405, serving gateway ("SGW") 410, mobility management entity device ("MME") 415, packet data network ("PDN") gateway ("PGW") 420, home subscriber server ("HSS")/authentication, authorization, accounting ("AAA") server 425 (hereinafter referred to as "HSS/AAA server 425"), policy charging and rules function ("PCRF") 430, LAN access point 407, network 440, and ePDG selector 445.

The quantity of devices and/or networks, illustrated in FIG. 4, is provided for explanatory purposes only. In practice, there may be additional devices and/or networks; fewer devices and/or networks; different devices and/or networks; or differently arranged devices and/or networks than illustrated in FIG. 4. Alternatively, or additionally, one or more of the devices of environment 400 may perform one or more functions described as being performed by another one or more of the devices of environment 400. Devices of environment 400 may interconnect via wired connections, wireless connections, or a combination of wired and wireless connections.

Environment 400 may include an evolved packet system ("EPS") that includes a long term evolution ("LTE") network and/or an evolved packet core ("EPC") network that operate based on a third generation partnership project ("3GPP") wireless communication standard. The LTE network may be, or may include, a RAN that includes one or more base stations 405, some or all of which, take the form of an eNodeB ("eNB"), via which user device 110 may communicate with the EPC network. The EPC network may include one or more SGWs 410, MMEs 415, and/or PGWs 420, and may enable user device 110 to communicate with network 440 and/or an Internet protocol ("IP") multimedia subsystem ("IMS") core network. The IMS core network may include HSS/AAA server 425, and may manage authentication, session initiation, account information, a user profile, etc. associated with user device 110.

User device 110 may include any computation and communication device, such as a wireless mobile communication device that is capable of communicating with base station 405, LAN access point 407, and/or network 440. For example, user device 110 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 110 may send traffic to and/or receive traffic from network 440 via signal bearers, such as ePDG 105, base station 405, SGW 410, and/or PGW 420.

Base station 405 may include one or more network devices that receive, process, and/or transmit traffic, such as calls, audio, video, text, and/or other data, destined for and/or received from user device 110. In one example, base station 405 may be an eNB device and may be part of the LTE network. Base station 405 may receive traffic from and/or send traffic to network 440 via SGW 410 and PGW 420. Base station 405 may send traffic to and/or receive traffic from user device 110 via an air interface.

LAN access point 407 may include one or more network devices that receive, process, and/or transmit traffic, such as calls, audio, video, text, and/or other data, destined for and/or received from user device 110. In some implementations, LAN access point 407 may be associated with a RAN that is not associated with the LTE network (e.g., a wireless hot spot, a wireless access point, etc.). For instance, LAN access point 407 may include a WLAN access point (e.g., a wireless access point that conforms to an IEEE 802.11x standard). In some implementations, LAN access point 407 may correspond to a wired access point, such as a wired router, switch, hub, or some other wired network device. LAN access point 407 may receive traffic from and/or send traffic to network 440 via ePDG 105 and PGW 420. In some implementations, LAN access point 407 may also receive traffic from and/or send traffic to network 440 via one or more other techniques (e.g., via the Internet or via another network). In some implementations, LAN access point 407 may send traffic to and/or receive traffic from user device 110 via an air interface.

SGW 410 may include one or more network devices that gather, process, search, store, and/or provide information. For example, SGW 410 may include a gateway, a router, a modem, a switch, a firewall, a network interface card ("NIC"), a hub, a bridge, a proxy server, or some other type of device that processes and/or transfers traffic. SGW 410 may, for example, aggregate traffic received from one or more base stations 405 and may send the aggregated traffic to network 440 via PGW 420.

EPDG 105 may include one or more network devices that gather, process, search, store, and/or provide information. For example, ePDG 105 may include a gateway, a router, a modem, a switch, a firewall, a NIC, a hub, a bridge, a proxy server, an optical add-drop multiplexer OADM, or some other type of device that processes and/or transfers traffic. EPDG 105 may, for example, aggregate traffic received from one or more LAN access points 407 and may send the aggregated traffic to network 440 via PGW 420. In some implementations, ePDG 105 may act as an interface between network devices provided and/or maintained by a network service provider (e.g., "trusted" devices or networks) and network devices that are not provided and/or maintained by the network service provider (e.g., "untrusted" devices or networks). For example, as shown in FIG. 4, communications between user device 110 and PGW 420 may be transmitted via ePDG 105 (e.g., communications received by ePDG 105 from LAN access point 407). In this example, LAN access point 407 may correspond to an access point that is not provided or maintained by a service provider associated with, for example, PGW 420.

While FIG. 4 shows one ePDG 105 for simplicity, environment 400 may, in practice, include multiple ePDGs 105. As mentioned above, these ePDGs 105 may be spread out over large distances. For example, one particular ePDG 105 may be located in California, while another ePDG 105 is located in Virginia.

MME 415 may include one or more computation and communication devices that gather, process, search, store, and/or provide information. For example, MME 415 may perform operations to register user device 110 with the EPS, to establish bearer channels associated with a session with user device 110, to hand off user device 110 from the EPS to another network, to hand off user device 110 from the other network to the EPS, and/or to perform other operations. MME 415 may perform policing operations on traffic destined for and/or received from user device 110.

PGW 420 may include one or more network devices, or other types of computation and communication devices, that gather, process, search, store, and/or provide information in a manner described herein. For example, PGW 420 may include a gateway, a router, a modem, a switch, a firewall, a NIC, a hub, a bridge, a proxy server, an OADM, or some other type of device that processes and/or transfers traffic. PGW 420 may aggregate traffic received from one or more SGWs 410, ePDGs 105, etc. and may send the aggregated traffic to network 440. PGW 420 may also, or alternatively, receive traffic from network 440 and may send the traffic toward user device 110 via SGW 410, base station 405, ePDG 105, and/or LAN access point 407.

HSS/AAA server 425 may include one or more server devices, or other types of devices, that gather, process, search, store, and/or provide information. For example, HSS/AAA server 425 may manage, update, and/or store, in a memory associated with HSS/AAA server 425, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; and/or other information. The subscriber may be associated with user device 110 and/or one or more other user devices 110. Additionally, or alternatively, HSS/AAA server 425 may perform authentication, authorization, and/or accounting operations associated with the subscriber and/or a communication session with user device 110.

PCRF 430 may include one or more server devices, or other types of devices, that aggregate information to and from the EPC network and/or other sources. PCRF 430 may receive information regarding policies and/or subscriptions from one or more sources, such as subscriber databases and/or from one or more users (such as, for example, an administrator associated with PCRF 430).

Network 440 may include one or more wired and/or wireless networks. For example, network 440 may include a cellular network, a public land mobile network ("PLMN"), a second generation ("2G") network, a 3G network, a 4G network, a fifth generation ("5G") network, and/or another network. Additionally, or alternatively, network 440 may include a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

In some implementations, network 440 may be provided by one or more cellular network providers. That is, in some such implementations, network devices within, or associated with, network 440, may be provided by the one or more cellular network providers. In some implementations, network 440 may be communicatively coupled to one or more other networks, such as the Internet.

EPDG selector 445 may include one or more server devices, or other types of devices, that select an ePDG 105, through which user device 110 should communicate with PGW 420. As described herein, ePDG selector 445 may, in some implementations, make this selection based on, for example, a geographic location of user device 110 and/or ePDG 105.

Figure 5:
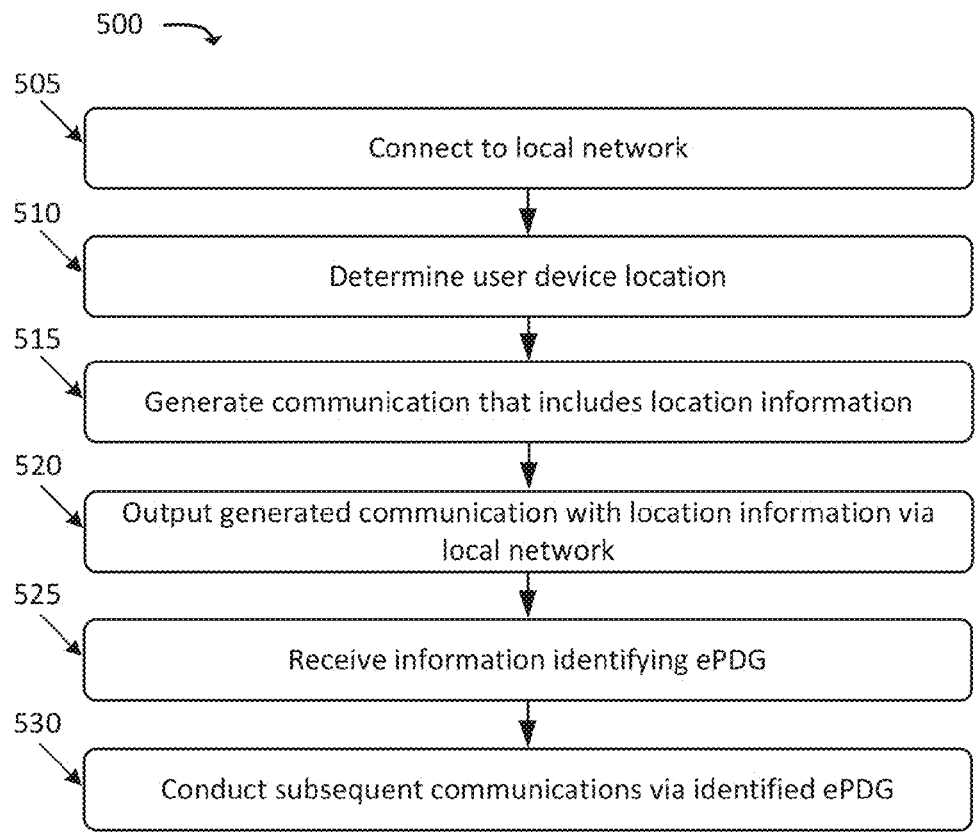
FIG. 5 illustrates an example process for a user device connecting to a gateway based on location of the user device and the gateway, according to one or more implementations described herein.

FIG. 5 illustrates an example process 500 for connecting to a gateway based on location of a user device and the gateway. In one example implementation, process 500 may be performed by user device 110. FIG. 5 is described below in conjunction with the example shown in FIGS. 6A-6E.

Process 500 may include connecting to a local network (block 505). For example, user device 110 may connect to LAN access point 407, which is associated with a local network. In some implementations, the local network may be a network that is not associated with a particular network provider, such as a cellular network provider associated with network 440. User device 110 may, for example, connect to a wireless LAN that conforms to an IEEE 802.11x standard. Via this connection, user device 110 may be able to communicate with (e.g., send data to and/or receive data from) one or more other networks, such as the Internet.

Process 500 may additionally include determining a location of user device 110 (block 510). For instance, user device 110 may include global positioning system ("GPS") functionality, and may determine a geographical location of user device 110 using the GPS functionality. Additionally, or alternatively, user device 110 may receive information indicating the geographical location of user device 110 from another source, such as from network 440. In some such implementations, network 440 may determine the geographical using cellular triangulation and/or another technique. In some implementations, the location (determined at block 510) may be expressed as a set of coordinates, such as a set of longitude and latitude coordinates. In some implementations, the determined location may be expressed using a different representation that indicates the geographical location of user device 110.

Process 500 may also include generating a communication that includes location information (block 515). For instance, user device 110 may generate a data packet, or a set of data packets, associated with a network application, such as, for example, a video conferencing application, a game application, a messaging application, or some other application. In some implementations, the application may be associated with network 440. For example, data associated with the application may be destined for one or more resources of network 440, such as an application server associated with network 440. That is, the generated data packets may indicate that a destination address of the data packets is, for example, an application server of network 440.

This communication may include information indicating a geographical location of user device 110 (e.g., the location information determined at block 510). In some such implementations, the communication may include an indication that the communication includes location information. For instance, header information associated with the communication may indicate that the communication includes location information. For example, in some such implementations, the header may include a flag (e.g., in a "flags" field of an IP header) that indicates that the communication includes location information.

In some implementations, the communication (generated at block 515) may be, or may be part of, a control message (e.g., a message that is not necessarily associated with a particular application). For instance, the communication may be, or may be included in, an Internet Control Message Protocol ("ICMP") message.

In some implementations, the communication (generated at block 515) may be a communication associated with a particular application. That is, in some such implementations, the communication may be based on a bearer packet associated with the application. For instance, the application may generate a bearer packet (e.g., a data packet, in which a payload of the data packet may include data related to the application). In some implementations, when generating the communication (at block 515), user device 110 may modify this bearer packet, and/or may generate a data packet based on the bearer packet. The generated or modified data packet may include information based on the bearer packet (e.g., may include some or all of the data included in the bearer packet) and the location information.

In some implementations, the communication (generated at block 515) may be a data packet that is generated while user device 110 generates data packets in connection with the application. For instance, assume that the application is a video conferencing application. Further assume that user device 110 is engaged in a video conference, using the video conferencing application (e.g., user device is sending and receiving data packets in connection with the video conferencing application). In some implementations, the communication (generated at block 515) may be a data packet that is generated during ongoing communications associated with the application. For example, in some implementations, user device 110 may generate the communication (that includes location information) periodically (e.g., every minute, every two minutes, every hour, etc.) during the video conference.

Additionally, or alternatively, user device 110 may generate the communication (that includes location information) based on connecting to the local network. For example, user device 110 may generate the communication (at block 515) as part of a handover procedure from a cellular network to the local network. That is, assume, for instance, that user device 110 is engaged in a video conference, using the video conferencing application. Further assume that user device 110 is sending and receiving data packets associated with the video conferencing application via base station 405. When user device 110 connects to the local network (e.g., connects to LAN access point 407), user device 110 may initiate a handover procedure to continue the video conference call by sending and receiving communications via LAN access point 407 in lieu of (or possibly in addition to, in some implementations) base station 405. As part of this handover procedure, user device 110 of some implementations may generate the communication that includes information regarding the location of user device 110.

Figure 6A:
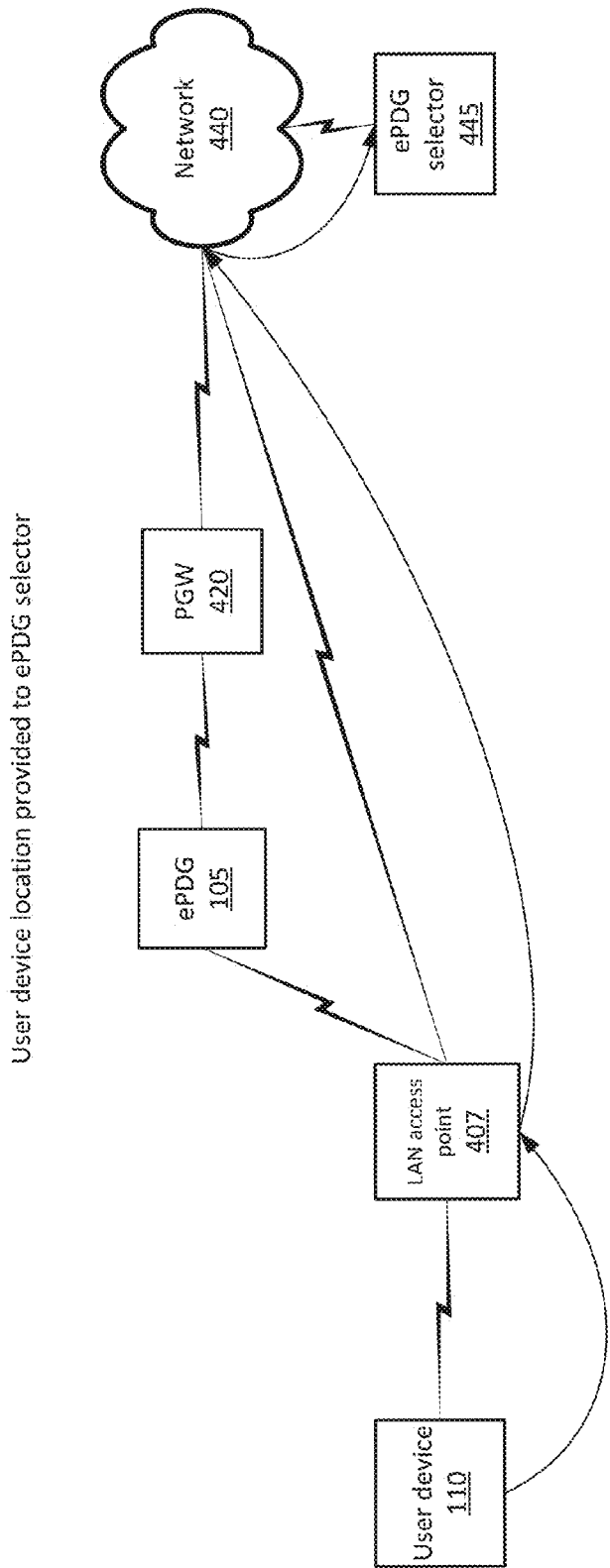
FIGS. 6A-6E illustrate an example of a user device connecting to a gateway based on location of the user device and the gateway, according to one or more implementations described herein.
Figure 6B:
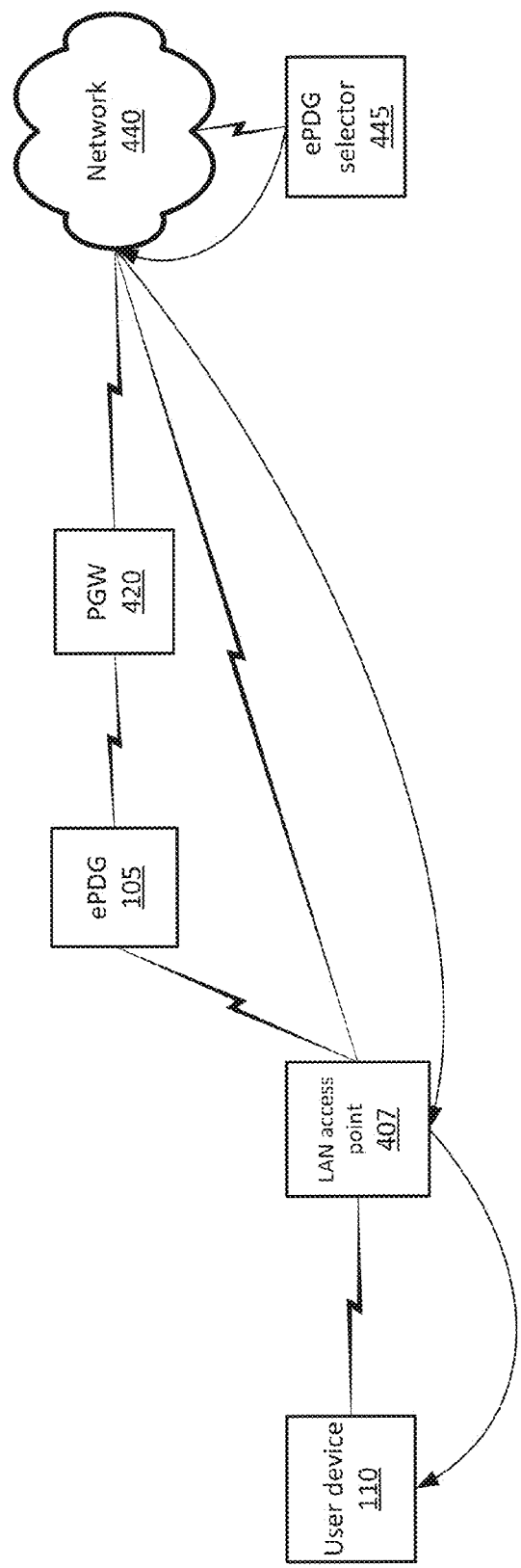

Process 500 may further include outputting the generated communication with the location information via the local network (block 520). For example, as shown in FIG. 6A, user device 110 may output the communication (generated at block 515) to LAN access point 407. LAN access point 407 may output the communication to network 440 (e.g., via one or more other networks, such as the Internet). EPDG selector 445 may receive the communication (or information extracted from the communication, such as the location information determined at block 510). As discussed below with respect to FIG. 8, ePDG selector 445 may select a particular ePDG 105 based on the location information. As shown in FIG. 6B, ePDG selector may output information regarding a selected ePDG 105 to user device 110, via LAN access point 407.

While FIGS. 6A and 6B are described above to illustrate an example of some implementations, other implementations may include additional, different, or fewer communications. For example, in some implementations, user device 110 may output the communication (generated at block 515) to base station 405 in lieu of (or possibly in addition to) LAN access point 407.

Returning to FIG. 5, process 500 may include receiving information identifying an ePDG (block 525). For example, user device 110 may receive information regarding a particular ePDG 105. As mentioned above, this information may be generated by ePDG selector 445. In some implementations, the particular ePDG 105 may be a geographically closest ePDG 105, out of a set of ePDGs 105, to user device 110. In some implementations, the information regarding the particular ePDG 105 may be information, based on which, user device 110 may send data to ePDG 105. For example, the information regarding the particular ePDG 105 may include an address of ePDG 105, such as an IP address, a uniform resource locator ("URL"), a uniform resource identifier ("URI"), or some other information identifying the particular ePDG 105.

Figure 6C:
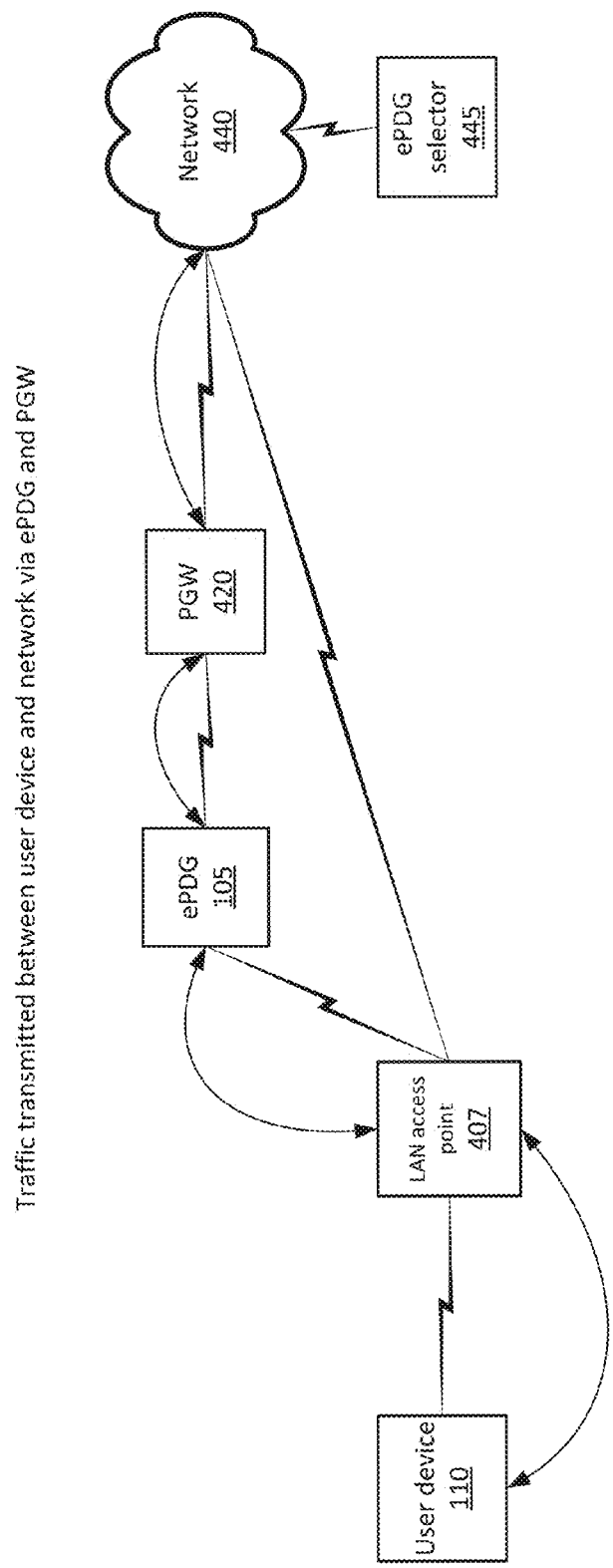

Process 500 may also include conducting subsequent communications via the identified ePDG (block 530). For example, as shown in FIG. 6C, user device 110 may send and/or receive communications to and/or from network 440 via ePDG 105 (e.g., via LAN access point 407, ePDG 105, and/or PGW 420). Continuing with the above example, these communications may be communications associated with an application, such as a video conferencing application. In some implementations, an application server may send and/or receive these communications via network 440.

Figure 6D:
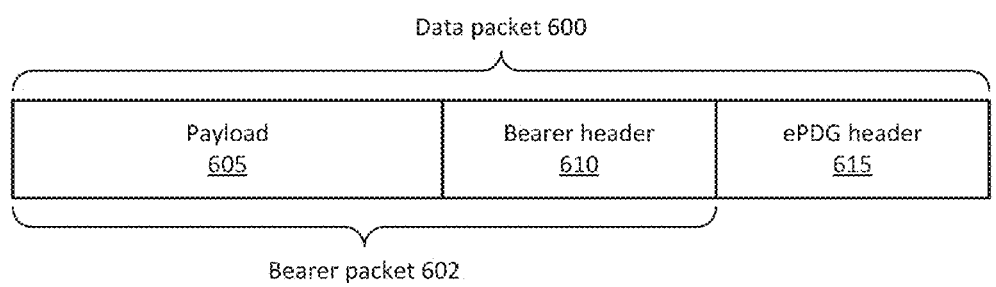

In order to conduct communications via the identified ePDG 105, user device 110 may modify data packets associated with the communications (e.g., communications associated with an application that is directed to a resources of network 440, such as a video conferencing application). For example, user device 110 may generate or modify data packets based on bearer packets associated with the application. FIG. 6D illustrates an example data packet 600, which may be based on a bearer packet associated with an application. Data packet 600 may include payload 605, bearer header 610, and ePDG header 615. Payload 605 and bearer header 610 may correspond to bearer packet 602, which may be associated with a particular application. For example, assume that the application is a video conferencing application. Payload 605 may include data related to the video conferencing application (such as, for example, video data and/or audio data), and bearer header 610 may include header information (such as, for example, a source address, a destination address (e.g., an address of an application server associated with network 440), protocol, and/or other information).

EPDG header 615 may include information such as, for example, a destination address, which may be based on the information received at block 525. For example, ePDG header 615 may identify an IP address of the particular ePDG 105 (identified by the information received at block 525) as a destination of data packet 600. In some implementations, ePDG header 615 may include other header information, such as source address, protocol, and/or other header information.

In some implementations, data packet 600 may be, or include, an IP packet. In some such implementations, bearer header 610 may be an IP header (e.g., an IPv4 header or an IPv6 header), and/or ePDG header 615 may be an IP header. In some implementations, data packet 600 may be, or include, a different type of packet.

Figure 6E:
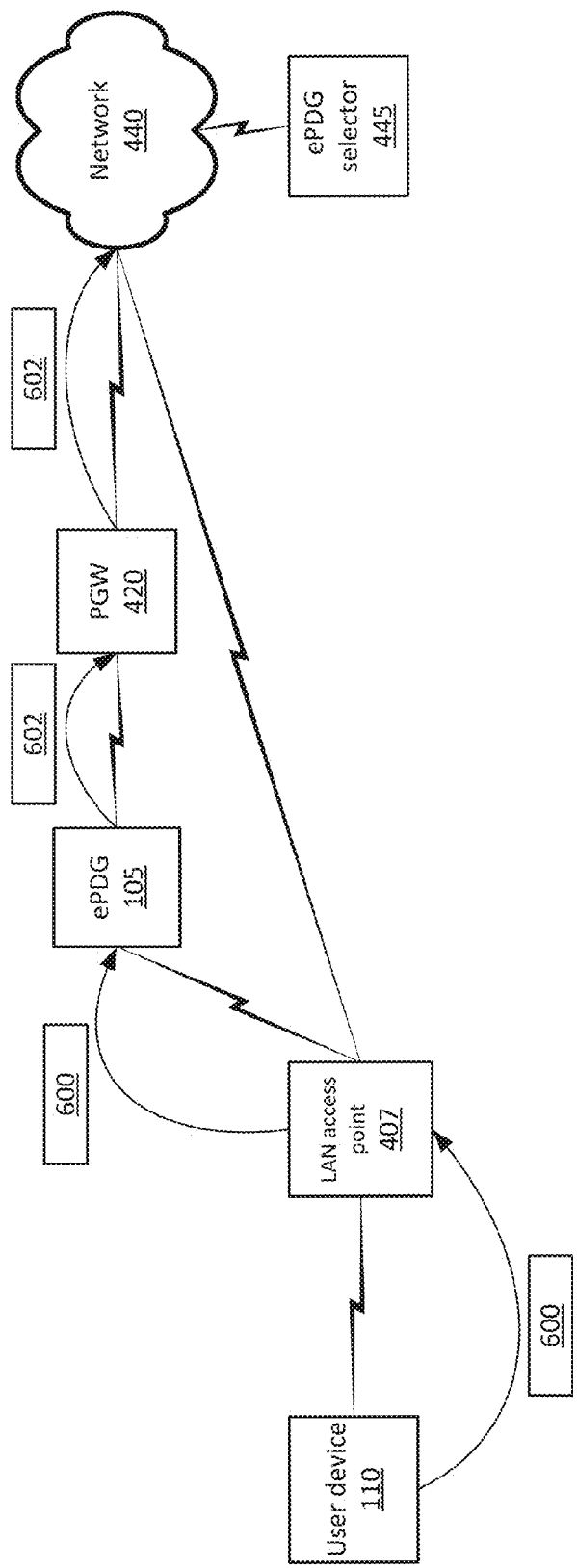

As shown in FIG. 6E, ePDG 105 may receive data packet 600, and may extract bearer packet 602 (e.g., payload 605 and bearer header 610) from data packet 600. In some such implementations, ePDG may "strip" ePDG header 615 from data packet 600 in order to extract bearer packet 602 from data packet 600. EPDG 105 may output the extracted bearer packet 602 toward a destination identified in bearer header 610. For example, ePDG 105 may output the extracted bearer packet 602 (or one or more data packets that are based on the extracted bearer packet 602) to PGW 420, which may output the extracted bearer packet 602 (or the one or more data packets that are based on the extracted bearer packet 602) to network 440.

While some communications may be conducted via ePDG 105 (at block 530), user device 110 may conduct other communications via different network devices (e.g., not via ePDG 105). For example, assume that user device 110 is presently outputting data related to a video conferencing application to an application server associated with network 440, and is concurrently outputting data related to a web browsing application. In some implementations, user device 110 may output the data related to the video conferencing application via ePDG 105 (e.g., by outputting data packets similar to example data packet 600, which are directed to ePDG 105 and include ePDG header 615), while outputting the data related to the web browsing application via another set of network devices (e.g., via LAN access point 407, which may output the data to a destination via the Internet, or via base station 405).

Figure 7:
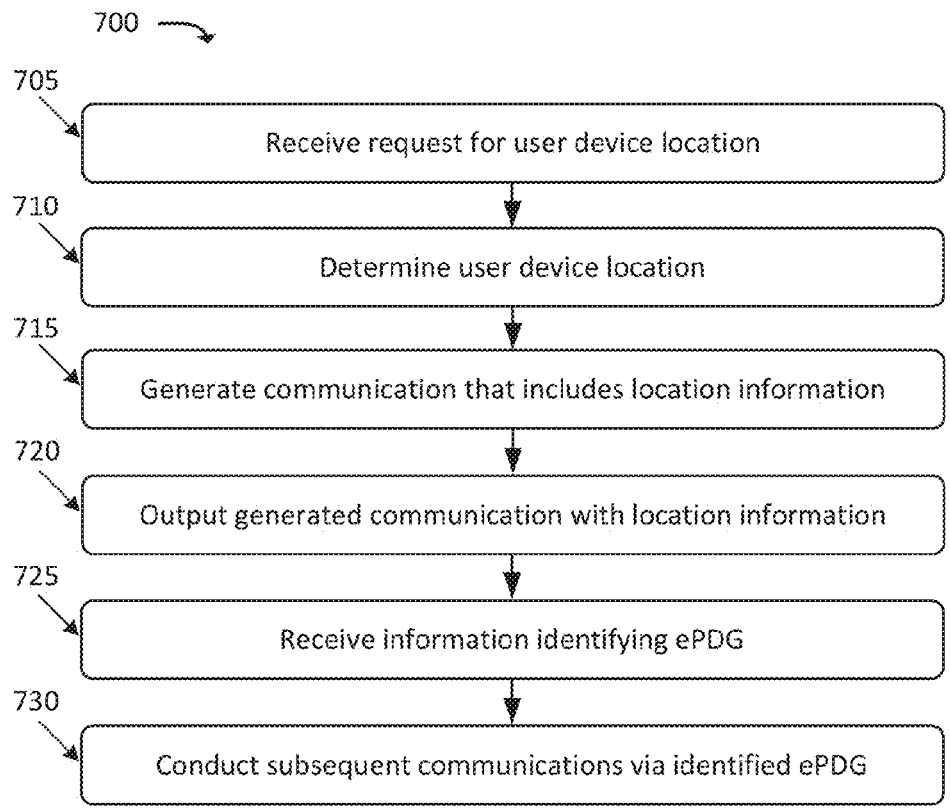
FIG. 7 illustrates an example process for a user device connecting to a gateway based on location of the user device and the gateway, according to one or more implementations described herein.

FIG. 7 illustrates an example process 700 for connecting to a gateway based on location of a user device and the gateway. In one example implementation, process 700 may be performed by user device 110. Some of the blocks of process 700 may be similar to some of the blocks described above with respect to process 500. In process 700, user device 110 may provide information regarding its location in response to a request from network 440, as opposed to providing its location to network 440 without prompting from network 440.

Process 700 may include receiving a request for a location of user device 110 (block 705). For example, user device 110 may receive a request from one or more devices associated with network 440 (e.g., an application server) for a location of user device 110.

Process 700 may also include determining a location of user device 110 (block 710). For example, as similarly discussed above with respect to block 510, user device 110 may determine and/or receive information regarding a geographical location of user device 110.

Process 700 may additionally include generating a communication that includes the location information (block 715). For example, as similarly discussed above with respect to block 515, user device 110 may generate a communication (e.g., a data packet, or a set of data packets) that include the location information. In some implementations, this communication may be associated with bearer packets of an application. In some implementations, this communication may be associated with a control message (e.g., an ICMP message).

Process 700 may further include outputting the generated communication with the location information (block 720). For example, user device 110 may output the generated communication to network 440. In some implementations, user device 110 may output the generated communication via a local network (e.g., via LAN access point 407). In some implementations, user device 110 may output the generated communication via one or more devices associated with network 440 (e.g., via base station 405). EPDG selector 445 may receive this communication (and/or location information extracted from this communication), and, as described below, may identify a particular ePDG 105 to associated with user device 110. EPDG selector 445 may output information regarding the identified ePDG 105 to user device 110 via, for example, LAN access point 407 and/or base station 405.

Process 700 may also include receiving information identifying a particular ePDG (block 725). For example, as similarly discussed above with respect to block 525, user device 110 may receive the information regarding the particular ePDG 105, outputted by ePDG selector 445, via LAN access point 407 and/or base station 405.

Process 700 may additionally include conducting subsequent communications via the identified ePDG (block 730). For example, as similarly discussed above with respect to block 530, user device may output data packets, such as data packets with an ePDG header 615, to ePDG 105 via LAN access point 407.

Figure 8:
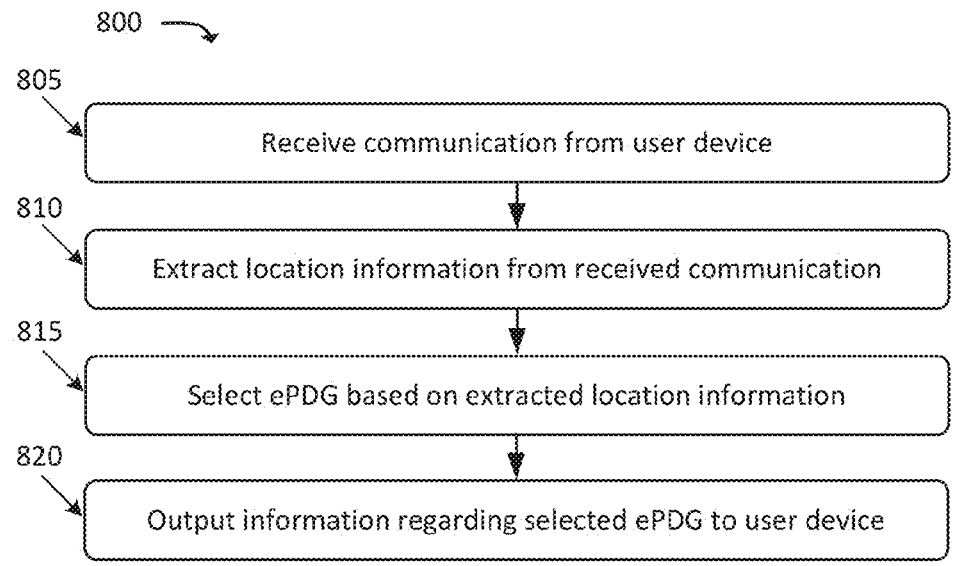
FIG. 8 illustrates an example process for selecting a gateway based on the location of a user device and the gateway, according to one or more implementations described herein.

FIG. 8 illustrates an example process for selecting a gateway based on location of a user device and the gateway. In one example implementation, process 800 may be performed by ePDG selector 445. In another example implementation, some or all of process 800 may be performed by a device or collection of devices separate from, or in combination with, ePDG selector 445.

Process 800 may include receiving a communication from a user device (block 805). For example, ePDG selector 445 may receive a bearer data packet and/or a control data packet outputted by user device 110. This communication may correspond to, for example, the communication outputted by user device 110 at block 520 of process 500, or at block 720 of process 700. EPDG selector 445 may receive the communication via network 440, base station 405, SGW 410, PGW 420, LAN access point 407, and/or another network (such as the Internet).

Process 800 may also include extracting location information from the received communication (block 810). For example, ePDG selector 445 may identify that the received communication includes location information. For instance, ePDG selector 445 may identify that a "flags" field in a header of the received communication indicates that the communication includes location information.

Process 800 may further include selecting an ePDG based on the extracted location information (block 815). For instance, ePDG selector 445 may store and/or receive information identifying geographical locations of a set of ePDGs 105. For example, in some implementations, ePDG selector 445 may receive information regarding the geographical locations of the set of ePDGs 105 from ePDGs 105 and/or some other device (e.g., a database that stores information regarding the geographical locations of the set of ePDGs 105). EPDG selector 445 may compare the locations of the set of ePDGs 105 to the extracted location information in order to select a particular ePDG 105. For instance, ePDG selector 445 may select a particular ePDG 105, which is closest to user device 110.

In some implementations, ePDG selector 445 may select a particular ePDG 105 based on one or more factors in addition to, or in lieu of, geographical locations of user device 110 and/or ePDGs 105. For example, in some such implementations, the communication (received from user device 805) may include information in addition to, or in lieu of, location information. For example, the communication may include information regarding device attributes (e.g., screen size, screen resolution, make and model of user device 110, and/or other information), attributes regarding a RAT used by user device 110 (e.g., a RAT associated with communications between user device 110 and base station 405), and/or attributes of an application associated with the communication (e.g., an application type, an application name, etc.). Based on this additional information, ePDG selector 445 may identify a quality of service ("QoS") level associated with the communication. The QoS level may indicate an amount of desired bandwidth for the communication, and/or a maximum amount of desired latency associated with the communication.

For example, ePDG selector 445 may identify that a particular user device 110 that is associated with a 4G RAT should be associated with a higher QoS level than another user device 110 that is associated with a 1×RAT (e.g., a RAT that provides lower bandwidth than a 4G RAT). As another example, ePDG selector 445 may identify that a particular user device 110 with a larger screen than another user device 110 may be associated with a higher QoS level than the other user device 110. As yet another example, ePDG selector 445 may identify that a video conferencing application may be associated with a higher QoS level than, for example, an Internet browsing application.

Based on the determined QoS level and/or the geographical locations of user device 110 and ePDGs 105, ePDG selector 445, of some implementations, may select a particular ePDG 105. For instance, in some such implementations, ePDG selector 445 may select an ePDG 105 that is not the closest ePDG 105 to user device 110. For example, assume that user device 110 and ePDG 105-1 are located in San Francisco, Calif., and that ePDG 105-2 is located in Los Angeles, Calif. Further assume that, based on an amount of load associated with ePDG 105-1, ePDG selector 445 determines that ePDG 105-1 will not be able to provide a desired QoS level for communications to and/or from user device 110. Also assume that ePDG selector 445 determines that ePDG 105-2 will be able to provide the desired QoS level for communications to and/or from user device 110. In this situation, ePDG selector 445 may select ePDG 105-2 (at block 815), even though ePDG 105-1 is closer to user device 110.

Process 800 may additionally include outputting information regarding the selected ePDG to the user device (block 820). For instance, ePDG selector 445 may store and/or receive information regarding ePDGs 105, such as identification information (e.g., IP addresses, URLs, URIs, or some other identifier). EPDG selector 445 may store and/or receive this identification information in connection with the information regarding the geographical locations of the set of ePDGs 105. In some implementations, ePDG selector 445 may output identification information (e.g., an IP addresses, a URL, a URI, or some other identifier) regarding the selected ePDG 105 to user device 110. In some implementations, ePDG selector 445 may output the identification information to user device 110 via LAN access point 407 (e.g., via the Internet or another network). In some implementations, ePDG selector 445 may output the identification information to user device 110 via base station 405, SGW 410, and/or PGW 420.

Figure 9:
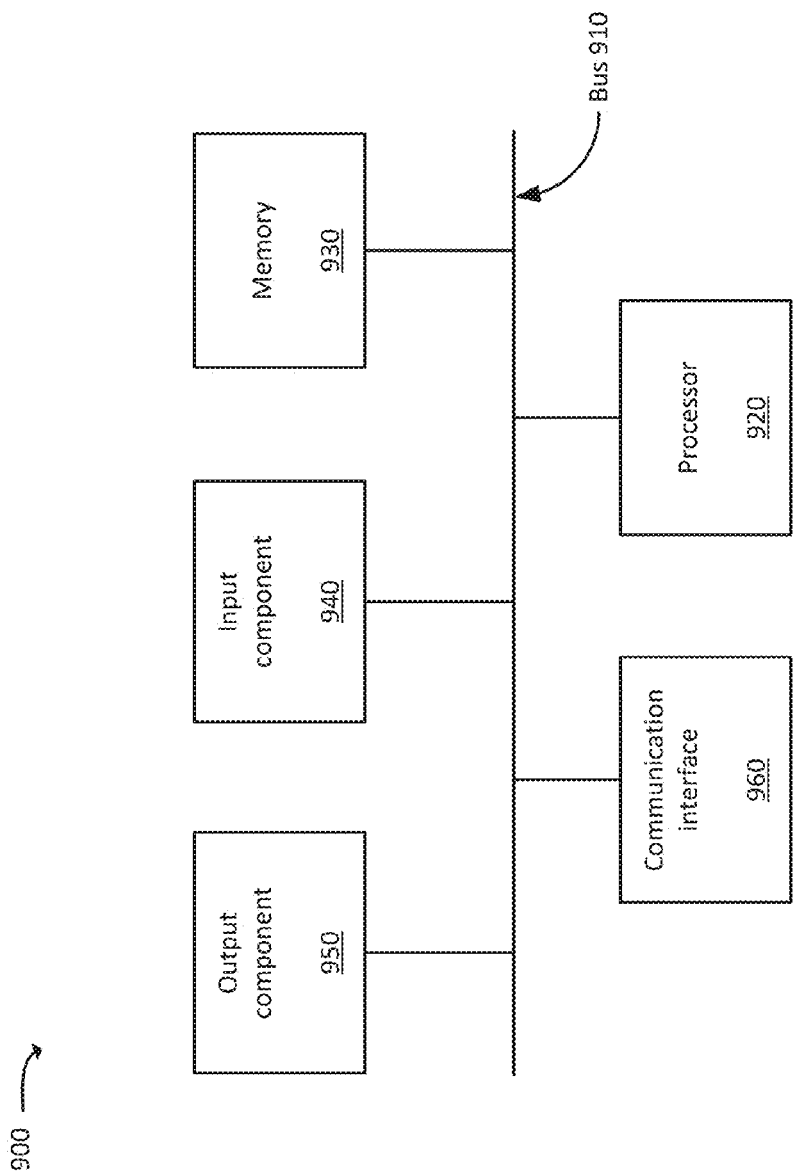
FIG. 9 illustrates example components of one or more devices shown in FIGS. 1-4.

FIG. 9 is a diagram of example components of device 900. Each of the devices illustrated in FIGS. 1-4 may include one or more devices 900. Device 900 may include bus 910, processor 920, memory 930, input component 940, output component 950, and communication interface 960. In another implementation, device 900 may include additional, fewer, different, or differently arranged components. Some non-limiting examples of device 900, with additional and/or different components, are discussed below.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 5, 7, and 8, the order of the blocks may be modified in other implementations. Further, non-dependent blocks may be performed in parallel.

Furthermore, while the above description was described in the context of selecting an ePDG, some implementations may select additional, or different, network components based on geographical location. For example, a base station, a SGW, and/or another network component may be selected based on the geographical location of the network component and a user device that communicates with the network component.

It will be apparent that embodiments, as described above, may be implemented in many different forms of software, firmware, and hardware in the implementations illustrated in the figures. The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items, and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method, comprising:
    receiving, by a server device that is associated with a cellular network, information regarding a geographical location of a user device;
    storing, by the server device, information indicating geographical locations at which each gateway device, of a set of gateway devices, is located,
        the gateway devices being associated with the cellular network, the gateway devices communicatively coupling one or more network devices associated with the cellular network to an access point that is not associated with the cellular network;
    comparing, by the server device, the geographical location of the user device to the stored geographical locations at which of the set of gateway devices are located;
    selecting, by the server device and based on the comparing, a particular gateway device, of the set of gateway devices, based on the geographical location of the user device and the geographical location of the particular gateway device; and
    assigning, by the server device, the selected particular gateway device to the user device, wherein assigning the selected particular gateway device causes the user device to communicate via the selected particular gateway device.

2. The method of claim 1, wherein the gateway device is an evolved packet data gateway ("ePDG").

3. The method of claim 1, wherein the selected particular gateway device communicatively couples the access point to a packet data network gateway ("PGW") wherein assigning the selected particular gateway device further causes the user device to communicate with the PGW via the selected particular gateway device.

4. The method of claim 3, wherein the access point communicates with the gateway device via at least one network that is different from the cellular network.

5. The method of claim 1, further comprising:
    requesting the information regarding the location of the user device,
    wherein receiving the information regarding the location of the user device is based on the requesting.

6. The method of claim 1, wherein receiving the information regarding the location of the user device is not based on requesting the information regarding the location of the user device.

7. A user device, comprising:
    one or more memory devices to store a set of instructions; and
    one or more processors to execute the instructions, to:
        identify a geographical location of the user device;
        output information regarding the location of the user device;
        receive, based on outputting the information regarding the location of the user device, information identifying that a particular gateway device, associated with a cellular network, has been assigned for communications with the user device, the particular gateway device having been selected, from a plurality of gateway devices associated with the cellular network, based on a proximity of the particular gateway device to the location of the user device;
        generate a first data packet, the first data packet being directed to a destination associated with the cellular network;
        generate a second data packet based on the first data packet, the second data packet indicating that a destination of the second data packet is the particular gateway device; and
        output the second data packet to the gateway device, wherein the gateway device extracts the first data packet and outputs a third data packet, that is based on the first data packet, toward the destination indicated by the first data packet.

8. The user device of claim 7, further comprising:
    receiving, from a device associated with the cellular network, a request for the information regarding the location of the user device,
    wherein outputting the information regarding the location of the user device is based on receiving the request.

9. The user device of claim 7, wherein outputting the information regarding the location of the user device includes outputting information regarding longitude and latitude coordinates.

10. The user device of claim 7, wherein outputting the information regarding the location of the user device includes outputting the information via an access point of a network that is different from the cellular network.

11. The user device of claim 7, wherein the gateway device communicatively couples an access point of a particular network, that is different from the cellular network, to one or more network devices of the cellular network.

12. The user device of claim 11, wherein the gateway device is an evolved packet data gateway ("ePDG").

13. A non-transitory computer-readable medium, comprising:
    a plurality of computer-executable instructions, which, when executed by one or more processors, cause the one or more processors to:
        receive information regarding a geographical location of a user device;
        compare the geographical location of the user device to geographical locations of a set of gateway devices, the gateway devices being associated with a cellular network, the gateway devices communicatively coupling one or more network devices associated with the cellular network to an access point that is not associated with the cellular network;

determine, based on the comparison, that a particular gateway device, of the set of gateway devices, is a geographically closest gateway device, of the set of gateway devices, to the user device; and assign the selected particular gateway device to send or receive communications to or from the user device.

14. The non-transitory computer-readable medium of claim 13, wherein the gateway device is an evolved packet data gateway ("ePDG") that communicatively couples the access point to a packet data network gateway ("PGW").

15. The non-transitory computer-readable medium of claim 14, wherein the access point communicates with the ePDG via at least one network that is different from the cellular network.

16. The non-transitory computer-readable medium of claim 13, wherein the information regarding the selected particular gateway device includes at least one of:

an Internet Protocol ("IP") address, a uniform resource locator ("URL"), or a uniform resource identifier ("URI").

17. The non-transitory computer-readable medium of claim 13, wherein the computer-executable instructions further cause the one or more processors to:

request the information regarding the location of the user device, wherein receiving the information regarding the location of the user device is based on the requesting.

18. The non-transitory computer-readable medium of claim 13, wherein receiving the information regarding the location of the user device is not based on requesting the information regarding the location of the user device.

19. The method of claim 1, wherein selecting the particular gateway device, of the set of gateway devices, based on the comparing of the geographical location of the user device and the geographical location of the particular gateway device, includes:

identifying that the particular gateway device is a geographically closest gateway device, of the set of gateway devices, to the user device.

20. The user device of claim 7, wherein the particular gateway has further been selected based on being a geographically closest gateway device, out of the plurality of gateway devices, to the user device.

* * * * *